US010329682B2

(12) United States Patent
Manera et al.

(10) Patent No.: US 10,329,682 B2
(45) Date of Patent: Jun. 25, 2019

(54) PROCESS FOR THE PRODUCTION OF A COMPONENT OF VALVES, FITTINGS OR TAP ASSEMBLIES, AND COMPONENT

(71) Applicant: Cromatura Staff S.A.S. Di Manera Giovanbattista & C., Brescia (IT)

(72) Inventors: Giovanbattista Manera, Brescia (IT); Francesco Tariello, Novara (IT)

(73) Assignee: CROMATURA STAFF S.A.S. DI MANERA GIOVANBATTISTA & C., Brescia (IT)

( * ) Notice: Subject to any disclaimer, the term of this patent is extended or adjusted under 35 U.S.C. 154(b) by 686 days.

(21) Appl. No.: 14/411,410

(22) PCT Filed: Jun. 26, 2013

(86) PCT No.: PCT/IB2013/055246
§ 371 (c)(1),
(2) Date: Dec. 26, 2014

(87) PCT Pub. No.: WO2014/002028
PCT Pub. Date: Jan. 3, 2014

(65) Prior Publication Data
US 2016/0168740 A1  Jun. 16, 2016

(30) Foreign Application Priority Data

Jun. 26, 2012 (IT) .......................... BS2012A0096 U

(51) Int. Cl.
*C25D 5/12* (2006.01)
*C25D 3/38* (2006.01)
(Continued)

(52) U.S. Cl.
CPC ................. *C25D 5/12* (2013.01); *C25D 3/04* (2013.01); *C25D 3/38* (2013.01); *C25D 7/00* (2013.01); *F16K 5/0657* (2013.01)

(58) Field of Classification Search
None
See application file for complete search history.

(56) References Cited

U.S. PATENT DOCUMENTS

| 4,282,597 A * | 8/1981 | Yenawine | C23C 14/20 174/546 |
| 2005/0178668 A1* | 8/2005 | Mobius | C23C 18/165 205/170 |
| 2012/0141821 A1* | 6/2012 | Rost | C23C 14/0641 428/621 |

FOREIGN PATENT DOCUMENTS

| DE | 10223081 A1 | 12/2003 |
| DE | 10240605 A1 | 2/2004 |

(Continued)

OTHER PUBLICATIONS

Examination Report No. 1 from the Australian Patent Office, dated Jan. 27, 2017.

(Continued)

*Primary Examiner* — Daniel J. Schleis
(74) *Attorney, Agent, or Firm* — Dorsey & Whitney LLP

(57) ABSTRACT

Process for the production of a component of valves, of fittings or of tap assemblies, including steps of providing a metal substrate, (electro-)depositing a first layer of copper on at least a portion of the metal substrate, and (electro-)depositing, on at least a portion of the first layer of copper and in direct contact therewith, a second shiny layer of chrome to obtain said component. A valve or tap assembly component made according to the aforesaid method.

18 Claims, 1 Drawing Sheet

(51) Int. Cl.
  *C25D 3/04*  (2006.01)
  *C25D 7/00*  (2006.01)
  *F16K 5/06*  (2006.01)

(56) References Cited

FOREIGN PATENT DOCUMENTS

| | | | |
|---|---|---|---|
| DE | 102005041375 | * | 3/2007 |
| DE | 102005041375 A1 | | 3/2007 |
| DE | 102010043046 | * | 5/2012 |
| DE | 102010043046 A1 | | 5/2012 |
| EP | 1533397 A2 | | 5/2005 |
| EP | 2460908 A1 | | 6/2012 |

OTHER PUBLICATIONS

International Search Report and Written Opinion for International Application No. PCT/IB2013/055246 dated Nov. 20, 2013.

* cited by examiner

PROCESS FOR THE PRODUCTION OF A COMPONENT OF VALVES, FITTINGS OR TAP ASSEMBLIES, AND COMPONENT

CROSS REFERENCE TO RELATED PATENT APPLICATIONS

The present invention is a United States nationalization of PCT/IB2013/055246, filed Jun. 26, 2013, and claims priority from Italian Patent Application No. BS2012A000096, filed Jun. 26, 2012, entitled "PROCESS FOR THE PRODUCTION OF A COMPONENT OF VALVES, OF FITTINGS OR OF TAP ASSEMBLIES, AND COMPONENT," the subject matters of which are incorporated by reference herein in their entirety.

BACKGROUND OF THE INVENTION

The present invention relates to a process for (electro-)depositing or coating a first layer of copper on a metal substrate surface and a second layer of chrome directly on the first layer, and to a component of valves, fittings or tap assemblies—preferably for plumbing and/or heating-plumbing purposes—obtained by means of such process.

Recent legislation has imposed the progressive elimination of nickel from tap and valve components having surfaces intended to direct contact drinking water due to the suspected toxicity of such metal. This requirement has already been adopted in some countries where the sale of valves comprising nickel is currently not recommended.

The problem of replacing nickel is a complicated task for manufacturers of the aforesaid components, as nickel is quite suitable for the subsequent depositing of chrome.

In fact, apart from nickel, very few metals offer surface coatings sufficiently hard so as to ensure duration of decades without suffering deterioration and are equally compatible with chrome so as to provide a product free of defects and qualitatively acceptable by the public.

Documents DE102010043046A1 and DE102005041375A1 describe processes for depositing chrome on a copper-plated metal component with solely decorative purposes. In particular, such processes require the presence of surfaces respectively overhanging or undercut so as to make patterns having an enhanced ornamental effect.

The prior document EP2460908A1 describes an electrolytic depositing of a layer of chrome on a substrate of a metal alloy of tin and copper, and subsequently the required protection of the layer of chrome by means of a precious metal such as gold, silver or platinum.

Document DE10223081A1 describes a procedure for covering a polymer body with a metalized layer by means of at least one non-electrochemical activation stage of such body.

Lastly, document EP1533397A2 describes a process for making a surface with an opaque effect, in the absence of nickel and chrome (VI).

The present invention falls within such context, providing a process for producing a final product with a degree of smoothness and shine at least comparable to that of products which comprise a nickel-coating.

SUMMARY OF THE INVENTION

Such objective is achieved by means of a process for producing a technical component of valves, fittings or tap assemblies, including the steps of: providing a metal substrate; (electro-)depositing a first layer of shiny copper on at least a portion of the metal substrate; and (electro-)depositing, on at least a portion of the first layer of copper and in direct contact therewith, a second layer of chrome, preferably shiny, to obtain said component.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE INVENTION

Figure 1:
FIG. 1 is a photographic view of a surface treated pursuant to the prior art after testing.

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

As discussed, the metal substrate surface, in substance, is a starting point for the component of valves, fittings or tap assemblies, which will be obtained as a final product or intermediate component following all the essential steps of the process described; such process provides in particular for depositing or electrodepositing a first layer of copper on at least a part of the metal substrate, and depositing or electrodepositing a second layer of chrome; the depositing or electrodepositing step of the second layer of chrome occurs directly on the first layer of copper, that is to say in the absence of further layers (metal-non-metal, compatible) interposed between the first layer of copper and the second layer of chrome.

In fact, according to a way of performing the present invention, it is possible to create a sufficiently shiny, homogeneous and compact layer of copper to favor the subsequent adhesion of the layer of chrome in order to obtain a product of optimal quality. Specifically, the second layer of chrome (and consequently the component) is preferably shiny and substantially free of imperfections.

In fact, the main problem associated with depositing chrome directly on a passive deposit, such as copper, is the generation of surface imperfections.

Within the present description, the term "passivity" or "passive deposit" is taken to mean the inability or resistance of a layer to receive a subsequent galvanic treatment.

Often, a passive deposit, which is chrome plated, presents a plurality of defects, such as burns, variations of color, or generation of rings, prejudicing the appearance of the final product.

Traditionally, in order to reduce the aforementioned problems, a step of acid pickling or a step of polishing with alkaline solutions in anodic current is usually performed after electrodepositing chrome on a passive deposit.

However, none of the aforesaid treatments produces satisfying results as the first treatment further prejudices the appearance of the final product, while the latter treatment merely produces a matt surface.

Conversely, the process according to the present invention eliminates the need for any post-depositing treatment of the copper, achieving nonetheless a qualitatively impeccable component.

According to one embodiment of the instant invention, the step of depositing the first layer of copper and/or the step of depositing the second layer of chrome comprises a physical vapor deposition (PVD) or a chemical vapor deposition (CVD).

According to a further embodiment of the present invention, the depositing of the first layer of copper and/or of the second layer of chrome is performed electrolytically. Preferably, the electrodepositing of the second layer is performed using pure unused chrome, that is to say chrome (or rather chrome ions) not previously used or recycled.

Yet a further embodiment of the present invention may have combined depositions by means of PVD, CVD, and/or electrodepositing.

Advantageously, the first layer of copper is flattened at least in the area in contact with the second layer of chrome. In this way the first layer of copper, apart from making the underlying metal substrate compatible with the chrome deposition, provides optimal conditions for obtaining a chemically and physically resistant layer of chrome having a shine at least comparable to the shine of traditional coatings using nickel above the metal substrate.

According to one variant, the first layer of copper and/or the second layer of chrome comprise respectively a copper and/or a chrome alloy, i.e., such elements combined with other metals, which are then incorporated in the respective metal layers. Consequently, according to these variants, the first layer of copper is actually a first layer of copper alloy and/or the second layer of chrome is a second layer of chrome alloy.

According to one variant, the first layer of copper and/or the second layer of chrome, respectively, comprise substantially pure copper and substantially pure chrome. For example, within the present description, the expression "substantially pure" is intended to mean a purity of not less than 90% in weight of copper/chrome of the layer considered, preferably 95% or more in weight, advantageously 98% in weight, and, optimally, substantially 100% in weight.

According to a further embodiment of the present invention, the thickness of the first layer of copper is about 6-14 times the thickness of the second layer of chrome, preferably about 8-12 times, advantageously about 9-11 times, for example, approximately or about 10 times.

According to a preferred embodiment of the instant invention, the thickness of the second layer of chrome is approximately 0.05-1.0 µm, in particular about 0.2-0.8 µm, advantageously about 0.3 to 0.7 µm, and optimally approximately 0.4-0.6 µm, preferably approximately 0.4-0.5 µm, for example substantially or about 0.5 µm. According to a preferred variant, the thickness ranges indicated above should be understood as minimum thicknesses of the chrome, below which it is not advisable to fall.

Preferably, the metal substrate is made of a copper alloy, such as brass. Other embodiments of the present invention may include iron, zamak, aluminum or its alloys, steel, etc.

According to a particularly advantageous embodiment, the metal substrate comprises at least one wall which defines at least one cavity of the substrate.

According to a first variant, the step of (electro-)depositing the first layer comprises a step of depositing or electrodepositing the copper also along the surfaces in the cavity of the substrate (and in particular on an inner surface defining the latter), while the step of (electro-)depositing the second layer comprises a step of depositing the chrome mainly externally (for example only externally) to the cavity of the substrate. For example, the term "mainly externally" is understood to mean that at least one zone of the cavity of the substrate is coated with the first layer of copper only.

In other words, this variant provides for exploiting the different penetration power of the copper and of the chrome so that only the copper penetrates into the cavity of the substrate. In fact, the chrome finds it hard to reach the area of low density current, or in any case is unable to cover the underlying layer of copper.

In the context of this embodiment, this circumstance does not, however, generate problems of any sort as, in this way, components of valves, fittings or tap assemblies have a very hard outer surface, to ensure a high number of functioning cycles of the valve, but an inner cavity also compatible with the most recent and strictest environmental and public health regulations.

In addition, the outer surface of the component, opposite to the inner surface and also comprising the second layer of chrome, thus defines a friction area of said component of valves, fittings or tap assemblies. Such friction area thus has features of great hardness, suitable to ensure a very high number of cycles.

Moreover, the cavity of the substrate comprising the first layer of copper only, performs an efficient bactericide function, which is an extremely desirable characteristic especially in water management and in particular in drinking water management.

For variants providing for an electrolytic deposition of chrome outside the cavity of the substrate, the use of solutions comprising ions of chrome (VI) is particularly preferred.

According to a second variant, the step of (electro-)depositing the second layer of chrome comprises a step of depositing or electrodepositing the second layer of chrome also in said cavity of the substrate, and in particular on an inner surface defining said cavity of the substrate.

For the variants providing for an electrolytic deposition of chrome on the inner surface defining the cavity of the substrate as well, the use of solutions comprising ions of chrome (III) is particularly preferred.

Advantageously, the aforementioned wall or inner surface defines a section of a duct for the flowing of a liquid, preferably for the flowing of drinking water.

According to a preferred variant, the step of electrodepositing the first layer is preceded by a step of providing a first highly acid galvanic solution, for example, having a pH not higher than about 2, preferably a pH of about 1 or less.

According to an advantageous embodiment, the first galvanic solution is an aqueous solution comprising sulphuric acid, copper sulphate and halide ions, preferably chloride ions. For example, the halide ions may be provided in the form of alkaline or alkaline-earth salt, in the case in point sodium chloride.

Preferably, the copper sulphate has a concentration greater than about 220 g/l, and advantageously lower than about 300 g/l. Preferably, such sulphate has a concentration of about 240-280 g/l, and advantageously substantially of about 260 g/l.

According to a further variant, the first galvanic solution comprises organic additives having a concentration of less than about 4.0 ml/l, and preferably less than about 3.5 ml/l. Preferably, such additives have a concentration of about 2.5 ml/l, or more. For example, a suitable concentration may be comprised in the range about 3.0-3.8 ml/l.

According to a further preferred variant, the step of (electro-)depositing the first layer of copper is performed at a temperature of about 30° C. or more, but advantageously lower than about 50° C. Preferably, such temperature is comprised in the range about 30-40° C., or about 30-35° C.

According to an embodiment, the step of electrodepositing the first layer of copper comprises a step of providing at the cathode a current density of about 1-6 A/dm². Advantageously, such current density is comprised in the range about 4-6 A/dm².

According to a first variant, the step of electrodepositing the second layer of chrome is preceded by a step of providing a second galvanic solution comprising chrome ions (III).

According to a second variant, the step of electrodepositing the second layer of chrome is preceded by a step of providing a second galvanic solution comprising ions of chrome (VI).

According to a third variant, the step of electrodepositing the second layer of chrome is preceded by a step of providing a second galvanic solution comprising a mixture of chrome (III) ions and of chrome (VI) ions.

According to a further variant, between the first and the second electrodeposition—whether the latter is performed with a galvanic solution comprising chrome (III) ions and/or chrome (VI) ions—a washing step is provided for, for example in an aqueous solution, so as to eliminate traces of the first galvanic solution.

The aforesaid objective is further achieved by a technical component of valves, fittings or tap assemblies, comprising a surface at least partially coated with a first layer of shiny copper, and comprising a second layer of chrome, preferably also shiny as a result of the underlying layer of copper, which overlaps the first layer and is in direct contact with at least a portion of the first layer.

Within the present description, the term "technical" is understood to mean a component configured to perform a function other than a merely decorative or ornamental function (as instead is the case in the aforementioned documents DE102010043046A1 and DE102005041375A1). This does not mean to say that jointly with the technical function, the component which the present description relates to may not also have improved aesthetic features but, as said, in presence of an improved functioning or resistance to abrasion/mechanics.

Preferably, such component is a ball for a ball valve. However, it should be understood that the inventive concept according to the present invention is not restricted to just this type of component.

As illustrated hereinabove, a component of valves, fittings or tap assemblies preferably comprises a metal substrate, on which the two different types of (electro-depositing are performed.

The metal substrate advantageously comprises at least one wall so as to define a cavity of the substrate, which, during the functioning of the valve, is the portion of the component (for example of the ball) which comes into contact with liquid or drinking water. Preferably an inner surface of such wall defines the cavity of the substrate.

As a result, the component, which the present invention relates to, preferably defines a section of a duct for the flowing of a liquid (such as drinking water), in particular, but not exclusively through the valve, fitting or tap.

According to a first embodiment, an inner surface of the wall is coated by the first layer of copper only. According to a further variant, the layer of chrome is deposited mainly externally to the cavity of the substrate, for example according to the definition supplied earlier.

According to such variant, the wall is coated internally by the first layer of copper so as to limit the presence of chrome mainly to the outer surface of the ball by exploiting the greater penetration power of the copper compared to that of chrome (and in particular compared to that of chrome (VI)).

According to a further embodiment, the wall or inner surface is coated by the first layer of copper and by the second layer of chrome.

For example, for the variants making use of an electrolytic deposition, such effect may be achieved with a solution of chrome (III).

Advantageously, the component defines an outer surface, opposite the inner surface which defines a friction area of said component of valves, fittings or tap assemblies. For example, such friction area comprises the outer surface—that is convex—of the ball utilisable in the valve.

According to a preferred embodiment, the thickness of the first layer of copper is about 6-14 times the thickness of the second layer of chrome, preferably about 8-12 times, advantageously about 9-11 times, and, for example, optimally approximately 10 times.

According to an advantageous embodiment, the thickness of the second layer of chrome is approximately 0.05-1.0 μm, in particular about 0.2-0.8 μm, advantageously about 0.3 to 0.7 μm, optionally approximately 0.4-0.6 μm, preferably approximately 0.4-0.5 μm, and, for example, optimally substantially 0.5 μm.

According to a non-limiting example, two embodiments of the present process and comparative tests aimed at highlighting the chemical and mechanical resistance of the corresponding component are described below, where FIGS. 1 and 2 of the DRAWINGS are, respectively, photographs of components according to the prior art and according to the invention as illustrated and described in connection with Example 3 set forth hereinbelow.

Example 1: Electrodeposition of Copper and Chrome on Copper

A metal substrate consisting of a ball for a ball valve composed entirely of brass is initially provided.

A first galvanic aqueous solution is prepared with about 260 g/l of pentahydrate copper sulphate, about 120 ml/l of sulphuric acid, about 60 g/l of chlorine ions (for example, provided in the form of sodium chloride), about 0.2 ml/l of the product COPPER GLEAM™ DL900-A, about 0.2 ml/l of the product COPPER GLEAM™ DL900-B and about 3.0 ml/l of the product COPPER GLEAM™ DL900-MAKE UP. The range of such products is sold under the brand names and codes indicated, by the DOW CHEMICAL COMPANY.

Such first galvanic solution is heated to an approximate temperature of about 30° C.

The aforesaid ball to be coated is connected to the cathode and inserted in the aforesaid solution applying a current density to the electrode of approximately 4 A/dm². Optionally, so as to avoid overheating the cathode, the electrodeposition may be performed moving the ball in the solution in an oscillating manner, to stir the galvanic solution and prevent overheating.

This way, the first layer of copper is electrodeposited both on the outer surface of the ball and on the inner walls of the cavity of the substrate, intended to come into contact with the drinking water when the valve is in the open position.

Subsequently, the semi-finished product thus obtained, after being washed sufficiently to remove the residues of the first galvanic solution, is subjected to at least partial chromeplating in a second galvanic solution comprising chrome (VI) ions, in such a way obtaining the finished ball, ready to be fitted in a rotatable manner inside the valve.

Example 2: Electrodeposition of Copper and Chrome on Copper

The testing done here is the same as that described in connection with Example 1, but a first aqueous galvanic solution is prepared with about 220 g/l of pentahydrate copper sulphate, about 70 g/l of sulphuric acid, about 60 mg/l of chlorine ions, about 0.2 ml/l of the product COPPER GLEAM™ DL900-A, about 0.2 ml/l of the product COPPER GLEAM™ DL900-B and about 3.0 ml/l of the product COPPER GLEAM™ DL900-MAKE UP, and such galvanic solution is heated to a temperature of approximately 30° C.

The ball to be coated is connected to the cathode, and inserted in the aforesaid solution applying a current density to the electrode of approximately 4 A/dm².

This way, the first layer of copper is electrodeposited both on the outer surface of the ball and on the inner walls of the cavity of the substrate, intended to come into contact with the drinking water when the valve is in the open position.

Subsequently, after being washed sufficiently to remove the residues of the first galvanic solution, at least partial chrome plating is performed in a second galvanic solution comprising chrome (VI) ions, in such a way obtaining the finished ball, ready to be fitted in a rotatable manner inside the valve.

Example 3: Chemical Resistance Tests of the Second Layer of Chrome

Balls for ball valves, according to the present process, of various diameters were immersed in a solution of chlorinated water, containing about 10 ppm of $ClO_2$ in water (the test also having been repeated at a concentration of over 100 ppm of $ClO_2$ in water). Such balls were produced according to the variants, including where the cavity of the substrate does not have a layer of chrome.

A ball for a ball valve according to the prior art, comprising a metal substrate coated by a first nickel layer, in turn, coated by a second layer of chrome, was immersed in an identical solution of chlorinated water (i.e., containing about 10 ppm or about 100 ppm of $ClO_2$).

The thickness of the nickel layer in the traditional ball was identical to the thickness of the layer of copper in the ball according to the invention and the thickness of the layer of chrome was identical in both balls. The metal of the metal substrate was also identical in both balls.

Such balls were left immersed for a period of approximately 2 weeks at ambient temperature. Subsequently the balls were removed from the solution, washed in water at ambient temperature without surface abrasions, left to dry and photographed, as illustrated and described in connection with FIGS. 1 and 2 of the DRAWINGS.

Figure 2:
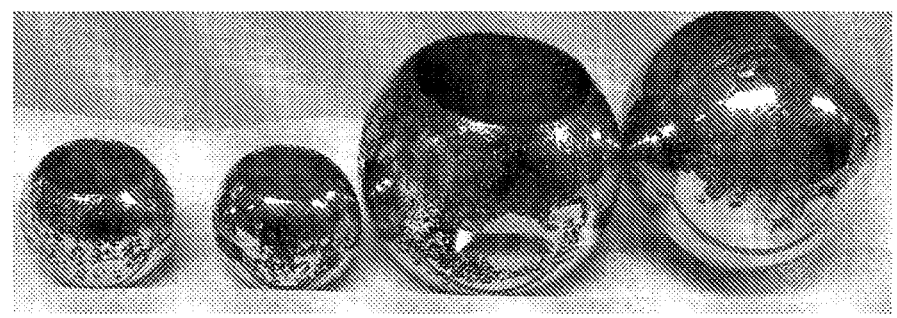
FIG. 2 is a photographic view of a surface treated or coated pursuant to the present invention after the same testing as shown and described in connection with FIG. 1.

As may be seen from the enclosed tables, and in particular in connection with FIG. 2, the ball treated according to the present invention does not substantially show any sign of surface corrosion since the second layer of chrome is intact and shiny.

Conversely, as illustrated in FIG. 1, the nickel-chrome ball according to the prior art has been markedly attacked by the acid solution, so that the second layer of chrome is corroded and peeling in various points.

This means that, despite copper having been selected as one of the possible materials suitable for replacing nickel, surprisingly, the copper-chrome coating is more stable and long-lasting than the nickel-chrome coating, which shows clear signs of wear from the beginning.

Example 4: Mechanical Resistance Tests of the Second Layer of Chrome

A ball for a ball valve is made here according to the technique in Example 1, and a further ball is made according to Example 1 as set forth in the afore-mentioned document EP1533397A2.

The balls made in this example are initially tested by means of a Mitutoyo Surftest SJ-400 roughness tester, and according to the reference standard EN331-2011.

The method of performing the aforesaid standard test was modified in a pejorative sense, in that the gaskets provided for by the standard were replaced by glass loaded gaskets and the number of cycles was raised from 5 cycles/minute (EN331-2011) to 10 cycles/min.

In testing, the roughness values according to the example of EP1533397A2 (CuCr1 and CuCr2) are double compared to the roughness value of shiny balls (CuCrL), substantially in all the measurements taken, as shown in the following Table 1.

TABLE 1

| Ref. | treatment | Ra | Rz | RSm | Rsk | Rppi |
|---|---|---|---|---|---|---|
| CuCr1 | Cu opaque + Cr | 0.12 | 1.1 | 258.0 | 0.50 | 98.4 |
|  |  | 0.40 | 2.9 | 103.7 | 1.58 | 245.0 |
| CuCr2 | Cu opaque + Cr | 0.13 | 1.4 | 308.8 | 1.25 | 82.3 |
|  |  | 0.19 | 2.0 | 160.9 | 2.14 | 157.8 |
| CuCrL | Cu shiny + Cr | 0.10 | 0.7 | 305.4 | 0.05 | 83.2 |
| Standard NiCr | Ni + Cr | 0.11 | 0.7 | 291.1 | −0.19 | 87.3 |

In addition, it may be observed from Table 2 hereinbelow that the maneuver torque of opaque balls (CuCr1) is higher than the maneuvre torque of the shiny balls (CuCrL). This feature makes opaque balls (CuCr1) unfit for technical use according to the present invention.

TABLE 2

| | Maneuvre torque in N.m. | | | |
|---|---|---|---|---|
| | pre-test measurements | | post-test measurements | |
| Ref. | Opening | Closing | Opening | Closing |
| CuCr1 | 16.5 | 13.5 | 9 | 11 |
| CuCrL | 8.5 | 7.5 | — | — |
| Standard NiCr | 8.5 | 9.5 | 9 | 11 |

The significantly lower covering power of the opaque copper compared to the covering power of the shiny copper is undoubtedly of note. This difference in the covering power is evident from a visual comparison between the inside of the balls and from the presence of marks and opacities on the outer surface.

The effect of the lower covering capacity of the opaque copper leads to the following consequences:

i) poor aesthetic appearance of the inside of the ball (visible to the user) giving an idea of a humble quality treatment;
ii) part of the inner surface is not protected by the copper plating; and
iii) the deposit of chrome on opaque copper is not shiny and therefore it is unsuitable for ball valves (to such purpose it should be noticed that roughness increases up to +300% and the maneuvre torque increases up to +94%).

In conclusion, comparing the results obtained with the Cr+Cu shiny ball, and the ball treated with Cr+Cu opaque, it appears evident that the second solution gives dramatically poorer results than the first.

Moreover, comparing a standard Ni—Cr ball with the ball treated with Cr+Cu shiny, it can be seen that the two treatments give practically equivalent results.

The ball according to the present invention thus shows surprisingly improved performance compared to the ball which the afore-mentioned patent EP1533397A2 relates to, and characteristics no less than corresponding to the traditional Ni—Cr balls.

Innovatively, the process and component of the present invention make it possible to obtain a final product with a degree of smoothness and shine at least comparable to that of products comprising nickel-coatings.

Despite the initial aim was that of replacing nickel with another non-toxic material, the process according to the present invention has also made it possible to achieve performances at least equal—in terms of chemical and mechanical resistance—to the performances achieved by traditional nickel-chrome systems.

Moreover, the present invention abandons the use of nickel traditionally employed to make valve, fitting and tap components.

Advantageously, by suitable selecting the aforesaid process parameters, according to the process of the present invention it is possible to obtain copper deposits which are not passive but, instead, apt to the subsequent deposition of chrome.

Advantageously, according to the process of the present invention it is possible to obtain excellent results minimising the fixed and variable costs of the plant.

Advantageously, according to the process of the present invention it is possible to unexpectedly obtain components having improved technical properties and extremely limited thicknesses of the metal layers.

It should be understood that persons skilled in the art may make variations to the embodiments of the aforesaid process and component, replacing elements with others functionally equivalent so as to satisfy specific requirements.

For example, despite the aforesaid example of implementation of the process has been illustrated using commercial products made by a specific manufacturer, further embodiments of the invention provide for the use of raw material and corresponding additives made by other manufacturers.

Such variants are also contained within the sphere of protection as defined by the following claims.

Each embodiment may be realised independently of the other embodiments described.

The previous descriptions are of preferred embodiments for implementing the invention, and the scope of the invention should not necessarily be limited by these descriptions. It should be understood that all articles, references and citations recited herein are expressly incorporated by reference in their entirety. The scope of the current invention is defined by the following claims.

What is claimed is:

1. A component having a surface thereon treated, said component comprising:
    a metal substrate having an outer surface on a ball for a ball valve and at least one wall having an inner surface defining a cavity within the substrate, the outer surface and the inner surface of the cavity being coated by a first layer of copper along a portion thereof; and
    a coating of chrome, said coating of chrome comprising a second layer covering at least a portion of the outer surface of said first layer, said first and second layers being in direct contact.

2. The component according to claim 1, wherein said component is selected from the group consisting of valves, fittings, tap assemblies, subcomponents thereof and combinations thereof.

3. The component according to claim 1, wherein said inner and outer surfaces are configured in a shape defining a section of a duct for the flowing of a liquid.

4. The component according to claim 1, wherein said outer surface is configured as a friction area of said component positioned for repeated cycles of contact with another element.

5. The component according to claim 1, wherein the thickness of the first layer of copper is about 6-14 times the thickness of the second layer of layer of chrome.

6. The component according to claim 5, wherein the thickness of the first layer of copper to the second layer is in a range selected from the group consisting of about 8-12 times, about 9-11 times, and about 10 times.

7. The component according to claim 1, wherein the thickness of the second layer of chrome is about 0.05-1.0 µm.

8. The component according to claim 7, wherein the thickness of the second layer of chrome is in a range selected from the group consisting of about 0.2-0.8 µm, about 0.3 to 0.7 µm, about 0.4-0.6 µm, about 0.4-0.5 µm, and about 0.5 µm.

9. The component according to claim 1, wherein said component comprises a material selected from the group consisting of a copper alloy, brass, zamak, aluminum, aluminum alloys, steel, and combinations thereof.

10. The component according to claim 1, wherein the coating of chrome is substantially external to the cavity.

11. A component having a surface thereon treated, said component comprising:
    a surface on a ball for a ball valve, the surface being coated by a first layer of copper along a portion thereof, and
    a coating of chrome, said coating of chrome comprising a second layer covering at least a portion of said first layer, said first and second layers being in direct contact.

12. A component having a surface thereon treated, the component comprising:
    a metal substrate having an outer surface and at least one wall having an inner surface defining a cavity within the substrate, the outer surface and the inner surface of the cavity being coated by a first layer of copper along a portion thereof; and a coating of chrome substantially external to the cavity such that one or more portions of the inner surface of the cavity are coated only with the first layer of copper, the coating of chrome comprising a second layer covering at least a portion of the outer surface of the first layer, the first layer and the second layer being in direct contact.

13. The component of claim 12, wherein the metal substrate having the outer surface and the inner surface is on a hydraulic path.

14. The component of claim 13, wherein the cavity is in fluid communication with the hydraulic path.

15. A component having a surface thereon treated, the component comprising:
    a metal substrate positioned in a hydraulic path and having an outer surface and at least one wall having an inner surface defining a cavity within the substrate, the outer surface and the inner surface of the cavity being coated by a first layer of copper along a portion thereof; and
    a coating of chrome substantially external to the cavity such that one or more portions of the inner surface of the cavity are coated only with the first layer of copper, the coating of chrome comprising a second layer covering at least a portion of the outer surface of the first layer, the first layer and the second layer being in direct contact.

16. A component having a surface thereon treated, the component comprising:
    a metal substrate positioned in a valve and having an outer surface and at least one wall having an inner surface defining a cavity within the substrate, the outer surface and the inner surface of the cavity being coated by a first layer of copper along a portion thereof; and
    a coating of chrome substantially external to the cavity such that one or more portions of the inner surface of the cavity are coated only with the first layer of copper, the coating of chrome comprising a second layer covering at least a portion of the outer surface of the first layer, the first layer and the second layer being in direct contact.

17. A component having a surface thereon treated, the component comprising:
    a metal substrate positioned in a valve assembly and having an outer surface and at least one wall having an inner surface defining a cavity within the substrate, the outer surface and the inner surface of the cavity being coated by a first layer of copper along a portion thereof; and
    a coating of chrome substantially external to the cavity such that one or more portions of the inner surface of the cavity are coated only with the first layer of copper, the coating of chrome comprising a second layer covering at least a portion of the outer surface of the first layer, the first layer and the second layer being in direct contact.

18. A component having a surface thereon treated, the component comprising:
    a metal substrate positioned in a tap assembly and having an outer surface and at least one wall having an inner surface defining a cavity within the substrate, the outer surface and the inner surface of the cavity being coated by a first layer of copper along a portion thereof; and
    a coating of chrome substantially external to the cavity such that one or more portions of the inner surface of the cavity are coated only with the first layer of copper, the coating of chrome comprising a second layer covering at least a portion of the outer surface of the first layer, the first layer and the second layer being in direct contact.

* * * * *